Oct. 19, 1954      E. D. SPRINGER      2,691,919
PRISMOIDAL REARVIEW MIRROR
Filed Feb. 16, 1949
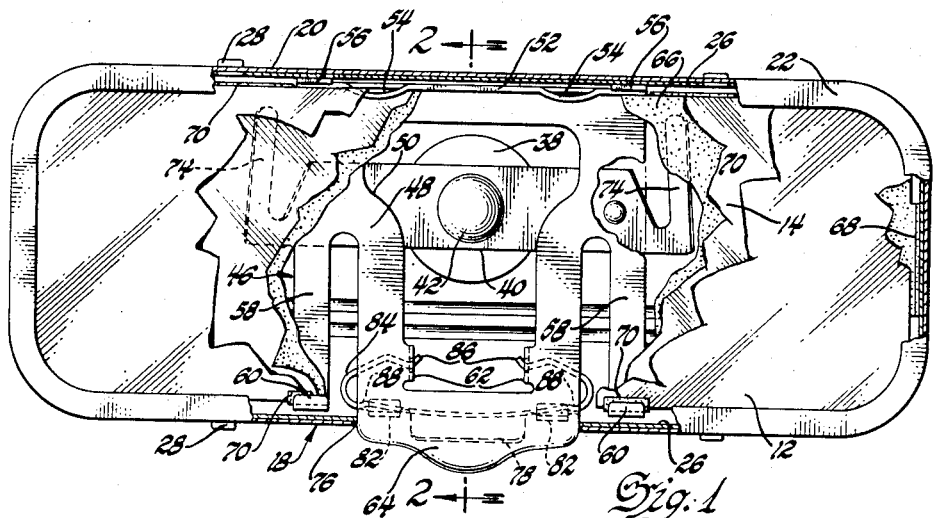
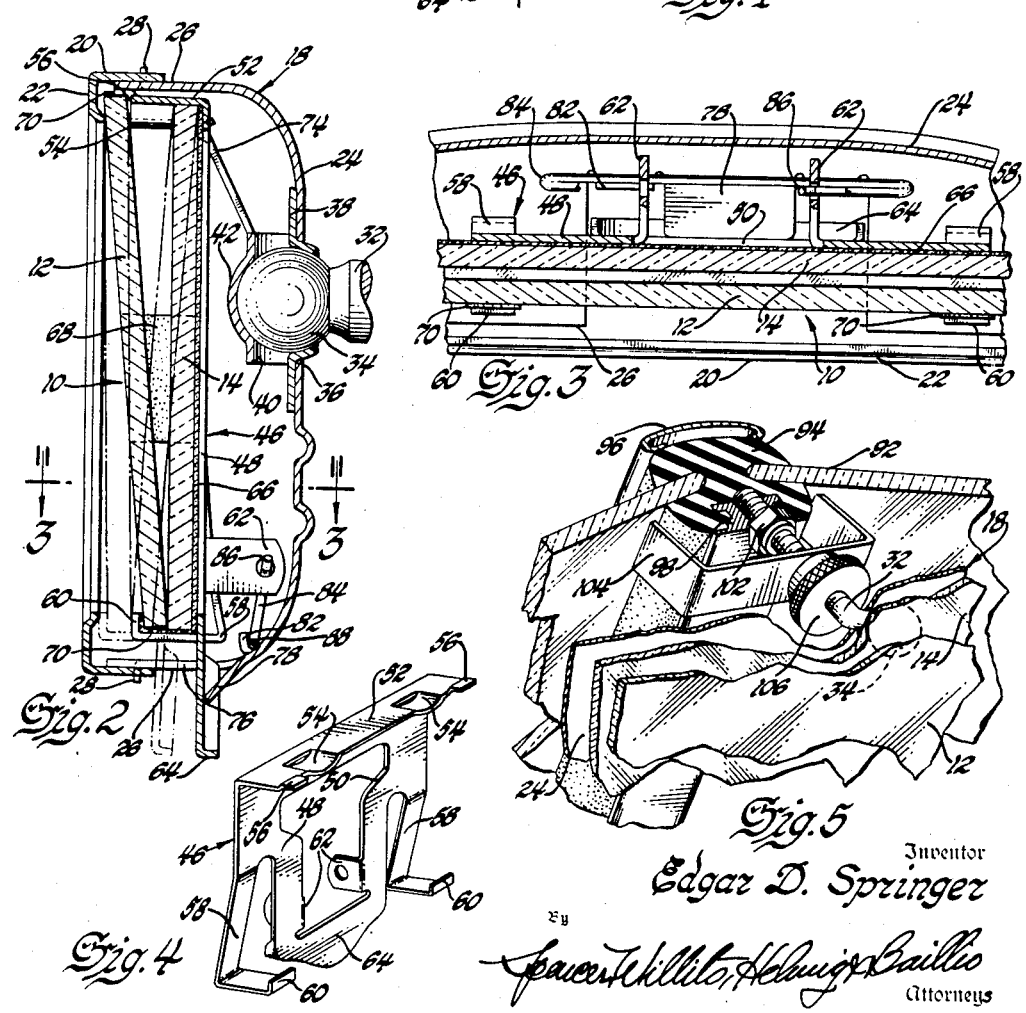
Inventor
Edgar D. Springer
Attorneys

Patented Oct. 19, 1954

2,691,919

UNITED STATES PATENT OFFICE 2,691,919

PRISMOIDAL REARVIEW MIRROR

Edgar D. Springer, Anderson, Ind., assignor to General Motors Corporation, Detroit, Mich., a corporation of Delaware Application February 16, 1949, Serial No. 76,771

3 Claims. (Cl. 88—77)

This invention relates to an improved prismoidal rear view mirror mounting.

The object of this invention is to provide a simplified, one-piece mounting for a two-part prismoidal mirror having one part with a low efficiency reflecting surface disposed in front of and at a small angle to a second part with a high efficiency reflecting surface.

Another object of the invention is to provide an enclosed housing in which a two-part prismoidal mirror having a simplified mounting to hold the two parts in operative relation is pivotally mounted within the housing, and resiliently held by a snap action spring which will hold the mirror in one position so that the driver will view a dim image in one part, or will hold the mirror in another position so that the driver will view a bright image in the other part.

Another object is to provide an improved mounting stud embodying a steady rest in order to mount the mirror without vibration.

Other objects and advantages of the invention will be apparent from the following drawing and description of a specific embodiment.

Figure 1 is a front elevation with parts broken away and in section of the rear view mirror.

Figure 2 is an enlarged section on the line 2—2 of Figure 1.

Figure 3 is a partial section on the line 3—3 of Figure 2 showing a top view of the swinging mechanism.

Figure 4 is a perspective view of the mirror cradle.

Figure 5 is a partial perspective view of the mirror mounted on a windshield showing the mounting bracket.

Referring to the drawing, the prismoidal mirror 10 consists of two generally rectangular sheets of plate glass or other suitable transparent sheet material. The sheets preferably are thin and have parallel plane surfaces to improve the reflected images and reduce weight. The front plate or mirror 12 has a low efficiency reflecting surface and is disposed vertically at a small angle, for example about 3½°, with respect to the rear plate or mirror 14 which has a high efficiency reflecting surface. The low efficiency reflecting surface of the front mirror 12 consists of two reflections, one from the front face and the other from the rear face. Since thin plate glass is used these reflections are substantially coincident. This two-plate mirror of ordinary mirror glass, which has an index of refraction of about 1.55, which has a dim image consisting of two coincident images, reflects about 10% of the light, while the one-part prismoidal type mirrors of the same glass, which have a dim image consisting of only one image, reflect about 5% of the light. The high efficiency reflecting surface is obtained by coating a surface of the rear plate 14 with a suitable reflecting surface, such as silver. The rear surface is generally covered to provide a more durable covering. However, the front face may be covered to provide a more efficient mirror having less durability.

This two-part or two-member prismoidal mirror is mounted in a housing generally indicated by the numeral 18. The frame consists of a rectangular frame 20 with a peripheral inturned flange 22 engaging the face of the front mirror 12 and a rectangular back portion 24 with a forwardly extending peripheral flange 26 positioned within the frame 20. The frame 20 is secured to the rear section by suitable means allowing the frame 20 and back flange 26 to be separated, such as, detent tabs 28 struck outwardly from flange 26 and extending through slots in frame 20.

The mirror is mounted on a ball stud 32 having a ball 34 at the end thereof. The ball 34 is positioned within aperture 36 in back portion 24 and seats on a ball seat 38 which is preferably merely held against the back portion 24 and positioned by the aperture 36 but may be spot welded to the back portion. A spring stirrup portion 40 is secured by rivets or welding on both sides of the ball 34 to the inside face of back portion 24, and has a central socket 42 seated on the top of ball 34 to frictionally hold it in the socket 38 to provide a universally adjustable mounting for the mirror housing 18.

The arrangement for pivotally mounting the mirror 10 within the housing 18 is best illustrated in Figure 2. The rearward or bright-image position is shown in solid lines, while the forward or dim-image position is shown in dot and dash lines. The front plate 12 and the rear plate 14 are mounted in a cradle 46 having a central back portion 48 suitably apertured at 50 to save weight. At the top a flange 52 extends forwardly at right angles to the back and has pressed abutments 54 extending inwardly to hold the rear plate 14 against the back, and a pair of raised extensions 56 extending slightly upward to provide fulcrum or pivot points and to hold the front plate 12 in the cradle. An abutment and extension fulcrum point are preferably located on each side of the cradle. At the lower part of each side of the cradle the back is recessed to provide a spring arm 58 having a hook 60 extending forwardly and engaging both the front and rear plates 12 and 14 and holding them against the back 48. As shown in Figures 2 and 4, the arm 58 is bent backward out of the plane of the back 48 and the throat of hook 60 is wider than the two plates 12 and 14, so that they are resiliently retained against the back by the hook. A pair of ears 62 extend rearwardly from the back 48, and are preferably formed by bending portions within the aperture 50 rearwardly. The lower portion of the cradle back 48 extends below the hooks 60 to provide a handle 64.

In order to protect the silver coating on the rear of rear plate 14, a paper or light cardboard protector 66 may be positioned between the rear plate 14 and the cradle 46. A side extension 68, which may be the full height of the mirror or less as illustrated, is employed to prevent the mirror rubbing against the housing and chipping the glass. The protector may also have top and bottom portions 70 which may be the full width of the mirror or less as illustrated. At least one of these top and bottom extensions should come under the hooks or top flange to provide adjustment for slight variations in glass size and protect the glass against chipping.

The mirror is mounted in the housing with the bottom edge of both the front and rear plates held in contacting relation and against the back of the cradle 46 by the hooks 60 and the top edge of the rear plate held by abutment 54 against the back of the cradle 46, and the top edge of the front plate maintained in spaced relation to the rear plate but not secured to the cradle. The top front edge of the front plate engages the flange 22 of the frame and the assembly of the mirror and cradle is held against the flange by spring fingers 74 having spherical ends bearing against the back of rear plate 14. The spring fingers 74 are formed integral with the stirrup but may be separate and secured to the back 24. The pivot or fulcrum extensions 56 are in engagement with the inside of flange 26. At the bottom of the housing 18 the flange 26 is suitably apertured or recessed so that the handle 64 may extend through the housing. The recess 76 has an adjustable tongue 78 which may be bent to various positions to determine the rear position of the mirror. At the rear edge of recess 76 a pair of tongues 82 are bent upwardly to provide spring seats. The C-shaped spring 84 in recumbent position has a suitable hook 86 at each end to engage an aperture in the ears 62. The spring may have undulations 88 to fit in the spring seats 82.

The cradle 46 holds the two-part mirror together and in pivotal relation with the housing. Since the mirror is clamped by the spring arm 58 and hook 60, there is a resilient holding action which reduces the possibility of breakage in assembly and use. In addition the flange 52 at the upper end of the cradle clamps rear plate 14, while front plate 12 is clamped by extensions 56. The front plate 12 is also resiliently held between the flange 22 and the cradle abutment 54 by the resilient spring 74. The spring 84 expands as the mirror moves toward either the forward (dim-image) position or the rearward (bright-image) position, and thus provides a simple but effective snap-action movement.

A mounting for the mirror is shown in Figure 5 which shows a position of the windshield panels 92 and the central moulded plastic post 94, which is stiffened and reinforced and held under compression by the outer strip moulding 96 and the inner moulding 98 and held by a lock nut 102. Between the lock nut and ball 34 the stud 32 passes through a suitable aperture in the central portion of a stabilizer bridge 104 formed of steel metal or plastic. A jam nut 106 holds the bridge against the windshield adjacent the post 94 to steady the rear view mirror 18 supported on stud 32 with respect to the windshield.

Various modifications will be apparent from the above described specific embodiment of the invention within the terms of the appended claims. It will be appreciated that the mirror may be used either in the position shown or in the inverted position, and thus that the terms top and bottom as used in the specification and claims are used for convenience and not as a limitation.

I claim:

1. In a mirror, a housing, a two-part mirror positioned within said housing, one part of said mirror having a low efficiency reflecting surface disposed in front of and at a small angle to another part having a high efficiency reflecting surface, a large aperture in the front face of said housing for admitting light to said reflecting surfaces, said mirror being mounted for pivotal movement about one edge of said housing between a forward and rearward position, a cradle element holding said two-part mirror, a resilient spring resiliently movably mounted on said cradle holding both said mirror parts to said cradle at the bottom, means on said cradle holding said another part to the cradle and said one part spaced from said another part, a spring acting between said housing and said cradle to hold said another part and the cradle against said one part and said one part against said housing, a spring seat on said cradle and said housing, and a compression spring positioned in said spring seats to urge said mirror toward either said forward or rearward position.

2. In a mirror, a housing, a two-part mirror positioned within said housing, one part of said mirror having a low efficiency reflecting surface disposed in front of and at a small angle to another part having a high efficiency reflecting surface, a large aperture in the front face of said housing for admitting light to said reflecting surfaces, said mirror being mounted for pivotal movement about one edge of said housing between a forward and rearward position, a cradle element holding said two-part mirror, a resilient spring resiliently movably mounted on said cradle holding both said mirror parts to said cradle at the bottom, said spring comprising a spring arm secured to said cradle and extending away from said cradle and said mirror, a throat arm attached to said spring arm extending toward and past said cradle and said mirror, a hook portion on the free end of said throat arm engaging the front of said one part at a point spaced inwardly from the edge to resiliently clamp both of said mirror parts against the back portion of said cradle, an abutment on said cradle holding said another part to the cradle and said one part spaced from said another part, a spring on said housing holding said another part and the cradle against the one part and said one part against the housing, and a spring seat on said cradle and said housing, and a compression spring positioned in said spring seats to urge said mirror toward either said forward or rearward position.

3. In a mirror, a housing, a two-part mirror consisting of two separate mirror panels positioned within said housing, one of said mirror panels having a low efficiency reflecting surface disposed in front of and at a small angle to a high efficiency reflecting surface on another of said mirror panels, a large aperture in the front face of said housing for admitting light to said reflecting surfaces, a cradle for supporting said mirror panels as an assembly, said cradle engaging the back of said another panel, means on one side of said cradle holding both said mirror panels together in fixed relation and securing both said panels to said cradle, means at the other side of said cradle holding said another mirror panel in fixed position on said cradle, abutment means on said cradle engaging the back face of said one panel and limting movement of said one panel toward said another panel and permitting movement of said one panel away from said another panel, a shoulder on the front of said housing engaging the front face of said one panel adjacent said another side of said cradle, spring means mounted on said housing engaging said mirror assembly to hold said front face of said one panel in pivotal engagement with said housing and shoulder and to hold said one panel in engagement with said abutment means to hold said cradle and mirror panel assembly together.

References Cited in the file of this patent

UNITED STATES PATENTS

| Number | Name | Date |
|---|---|---|
| 970,636 | Miller | Sept. 20, 1910 |
| 1,478,689 | Winans | Dec. 25, 1923 |
| 1,919,475 | McKinley | July 25, 1933 |
| 2,091,203 | Hay | Aug. 24, 1937 |
| 2,322,395 | Sheppard | June 22, 1943 |
| 2,356,432 | Roedding | Aug. 22, 1944 |
| 2,397,947 | Colbert | Apr. 9, 1946 |
| 2,455,818 | Sherts | Dec. 7, 1948 |
| 2,469,207 | Roedding | May 3, 1949 |